(12) United States Patent  (10) Patent No.: US 7,603,454 B2
Piper  (45) Date of Patent: Oct. 13, 2009

(54) SYSTEM AND METHOD FOR CLUSTERED TUNNELING OF REQUESTS IN APPLICATION SERVERS AND TRANSACTION-BASED SYSTEMS

(75) Inventor: Andrew Piper, Pleasanton, CA (US)

(73) Assignee: BEA Systems, Inc., Redwood Shores, CA (US)

( * ) Notice: Subject to any disclaimer, the term of this patent is extended or adjusted under 35 U.S.C. 154(b) by 642 days.

(21) Appl. No.: 11/129,900

(22) Filed: May 16, 2005

(65) Prior Publication Data

US 2006/0047831 A1    Mar. 2, 2006

Related U.S. Application Data

(60) Provisional application No. 60/572,644, filed on May 19, 2004.

(51) Int. Cl.
  *G06F 15/173* (2006.01)
(52) U.S. Cl. .................. 709/223; 708/203; 708/217; 708/238; 718/105
(58) Field of Classification Search ........... 709/203, 709/217, 223, 224, 225, 226, 238; 718/105; 707/E17.01
See application file for complete search history.

(56) References Cited

U.S. PATENT DOCUMENTS 6,330,605 B1 * 12/2001 Christensen et al. ........ 709/226
6,424,992 B2 * 7/2002 Devarakonda et al. ...... 709/203
6,473,802 B2 * 10/2002 Masters ...................... 709/229
7,185,096 B2 * 2/2007 Kalyanavarathan et al. . 709/226
2005/0160161 A1   7/2005 Barrett et al.
2008/0034052 A1 * 2/2008 Bess et al. .................. 709/207

OTHER PUBLICATIONS

PCT International Search Report re: PCT Application No. PCT/US05/17345 dated Jan. 5, 2007 (7 pages).

* cited by examiner

*Primary Examiner*—Lashonda T Jacobs
(74) *Attorney, Agent, or Firm*—Fliesler Meyer LLP

(57) ABSTRACT

A system and method for clustered tunneling of requests in application servers and other systems is provided. The system includes a client, a cluster having a plurality of members, and a proxy. The cluster does not advertise the internal addresses of its members since clients might attempt to directly connect to that member. Instead, the client is configured to include a tunneling layer within which the proxy address is set. The advertised address of the cluster member is then set in a header at the client. During runtime, the client connects to the proxy as before, but then uses its internal information to connect or communicate with the appropriate cluster member. In accordance with an embodiment the client sets a cookie which is then sent to the proxy. The proxy re-writes the cookie with the appropriate cluster member information and uses this information to tunnel the request to the appropriate server.

20 Claims, 3 Drawing Sheets

SYSTEM AND METHOD FOR CLUSTERED TUNNELING OF REQUESTS IN APPLICATION SERVERS AND TRANSACTION-BASED SYSTEMS

CLAIM OF PRIORITY

This application claims priority from provisional application entitled, SYSTEM AND METHOD FOR CLUSTERED TUNNELING OF REQUESTS IN APPLICATION SERVERS AND TRANSACTION-BASED SYSTEMS, application Ser. No. 60/572,644, filed May 19, 2004, by Andrew Piper and incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The invention is related generally to application servers, messaging systems, and transaction-based systems, and specifically to a system and method for clustered tunneling of requests in those systems.

BACKGROUND

In a typical clustered enterprise level application server environment, clients may access the cluster using the Internet Interoperability Protocol (IIOP). FIG. 1 shows an example of such a clustered system. The cluster 100 comprises a number of servers or cluster members C1 102, C2 104, C3 106, each of which can be identified by an object request (IOR) specifying the servers name or address, and a port identifier. The client 108 makes IIOP requests 110 upon the cluster using tunneled IIOP. The problem is that this only works when the client communicates directly with the cluster and no proxy is involved. If, as is shown in FIG. 1, a proxy 114 is involved then the situation becomes more complicated:

Proxy's that are hardware load balancers are unable to route requests to specific servers. They can only pick servers at random and then use some form of "stickiness" in the http header information. Client-side clustering relies on the ability to route to specific servers;

Proxy's generally perform Network Address Translation (NAT), requiring that cluster member (IOR's) advertise the address of the proxy rather than the actual external addresses of the cluster members. So whereas in the example shown in FIG. 1, each of the cluster members C1 through C3 have a distinct address and port, the proxy can only advertise a single address and port to the client;

Unsigned applets can only open connections to the servers that can be accessed.

In order to provide efficient load-balancing and failover throughout the enterprise, there exists a need for a mechanism by which tunneled IIOP clients can work in clustered environment.

SUMMARY

In accordance with an embodiment of the present invention, a system and method for clustered tunneling of requests in application servers and other systems is provided. The system includes a client, a cluster having a plurality of members, and a proxy. The cluster does not advertise the internal addresses of its members since clients might attempt to directly connect to that member. Instead, the client is configured to include a tunneling layer within which the proxy address is set. The advertised address of the cluster member is then set in a header at the client. During runtime, the client connects to the proxy as before, but then uses its internal information to connect or communicate with the appropriate cluster member. In accordance with an embodiment the client sets a cookie which is then sent to the proxy. The proxy re-writes the cookie with the appropriate cluster member information and uses this information to tunnel the request to the appropriate server.

DETAILED DESCRIPTION

Figure 1:
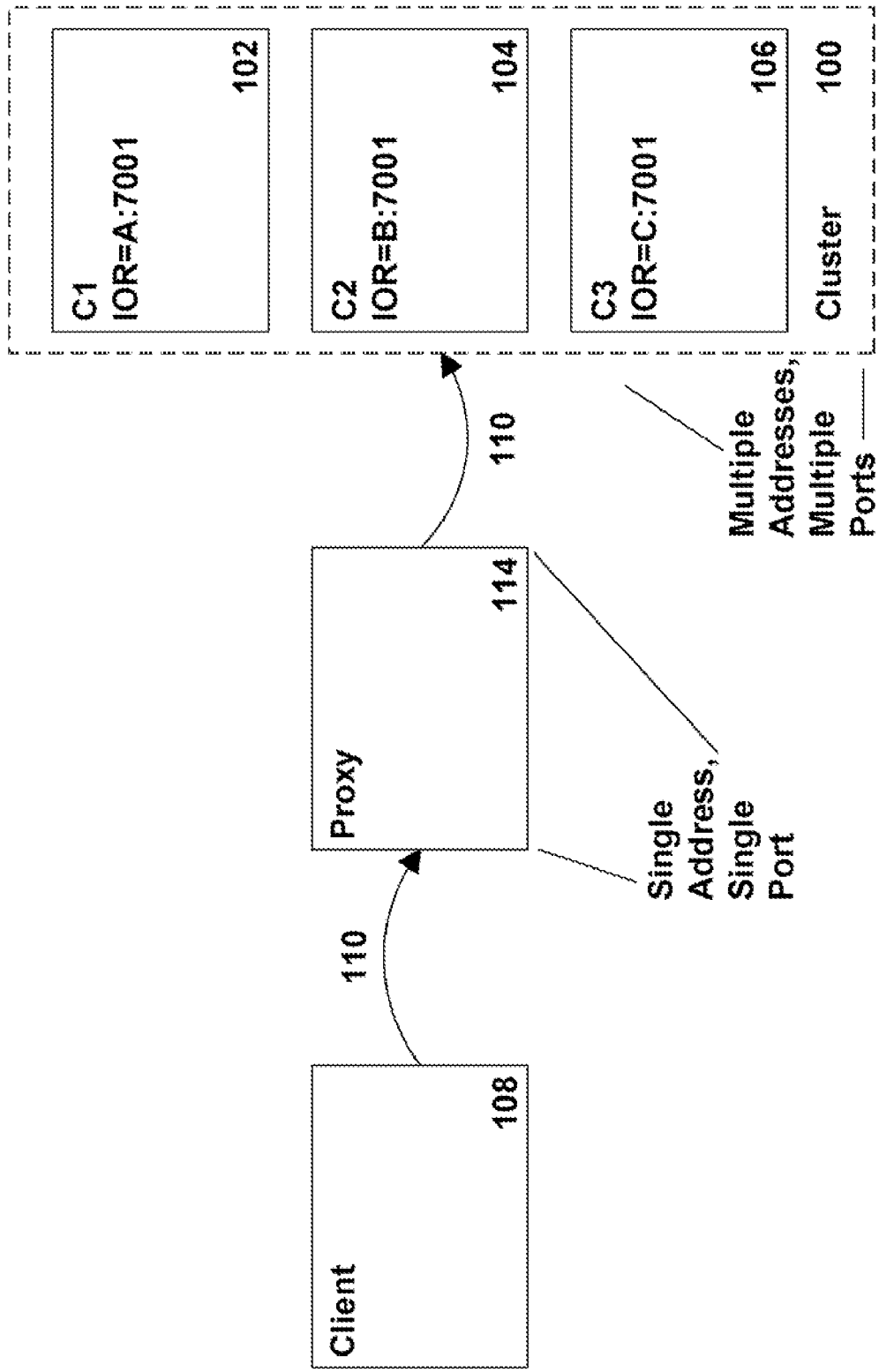
FIG. 1 shows an example of a clustered system that does not provide clustered tunneling of requests.

In accordance with an embodiment of the present invention, a system and method for clustered tunneling of requests in application servers and other systems is provided. The system includes a client, a cluster having a plurality of members, and a proxy. The cluster does not advertise the internal addresses of its members since clients might attempt to directly connect to that member. Instead, the client is configured to include a tunneling layer within which the proxy address is set. The advertised address of the cluster member is then set in a header at the client. During runtime, the client connects to the proxy as before, but then uses its internal information to connect or communicate with the appropriate cluster member. In accordance with an embodiment the client sets a cookie which is then sent to the proxy. The proxy re-writes the cookie with the appropriate cluster member information and uses this information to tunnel the request to the appropriate server.

A principal problem with proxy's that are hardware load balancers is that they are unable to route requests to specific servers. They can only pick servers at random and then use some form of "stickiness" in the http header information. Client-side clustering relies on the ability to route to specific servers. In addition, proxy's generally perform Network Address Translation (NAT), requiring that cluster member (IOR's) advertise the address of the proxy rather than the actual external addresses of the cluster members. Also, unsigned applets can only open connections to the servers that can be accessed. There are three proposed solutions to this problem:

Using the proxy to perform client directed load-balancing and failover;

Performing server-side load-balancing and failover; and

Performing client-side load-balancing, with failover via HTTP 400.

Proxy load-balancing requires that actual addressing information is carried out-of-band and acted on by the proxy. Most load-balancers support URL-directed load balancing, so it is possible for a tunneled client to embed addressing information in the URL, and for the load balancer to route the request based on this embedded information. This has the additional property that plugins would not be necessary in the application server. Instead, each application server is individually configured in the load balancer or web server that receives the request.

With both server-side and client-side load balancing, selection of the target server is triggered when a request is sent to or received at the cluster. The proxy is not assumed to maintain connections to specific hosts, only that it can make repeated requests to a server it as already been connected to. An initial request may be randomly routed to any cluster member, but will carry addressing information for the server to which the request is intended. The request is then communicated to the correct server. When routed the request is infected with appropriate session information that causes the proxy to continue sending requests to that server. The addressing information can be carried in a number of ways, including:

Rewrite the URLs to encode addressing information. In this implementation, tunneled requests are rewritten based on the target server address and port information. For example, if the proxy is located at proxyhost:80, and the cluster member is located at cluster1:7001, then a tunneled request may be written as:

http://proxyhost:80/wls_internal/cluster1/7001/iiop or a variation thereof, depending on the particular implementation as to how the requests should be prepared.

An alternative means is to add addressing information in a custom HTTP header.

Having provided the address information, load balancing and failover may then be performed either by server-side load balancing, or client-side load balancing.

With server-side load balancing, each member of the cluster is configured to proxy requests based on the cluster information in the URL or header. Thus, even if a request fails over and a load balancer picks a new host, that request would still end up on the appropriate server. When the response is sent back to the client, it contains an appropriate cookie for the target server. If the server has already been accessed by the load balancer then subsequent requests will be routed correctly.

With client-side load balancing, the scenario is similar, but instead of routing the request, the server raises a HTTP 400 message. If the load balancer knew about that server, it would route accordingly, if not then the client would keep retrying until it reached another server. In this instance the servers do not need to proxy at all, they simply have to be able to set appropriate cookie information for the client to use.

Figure 2:
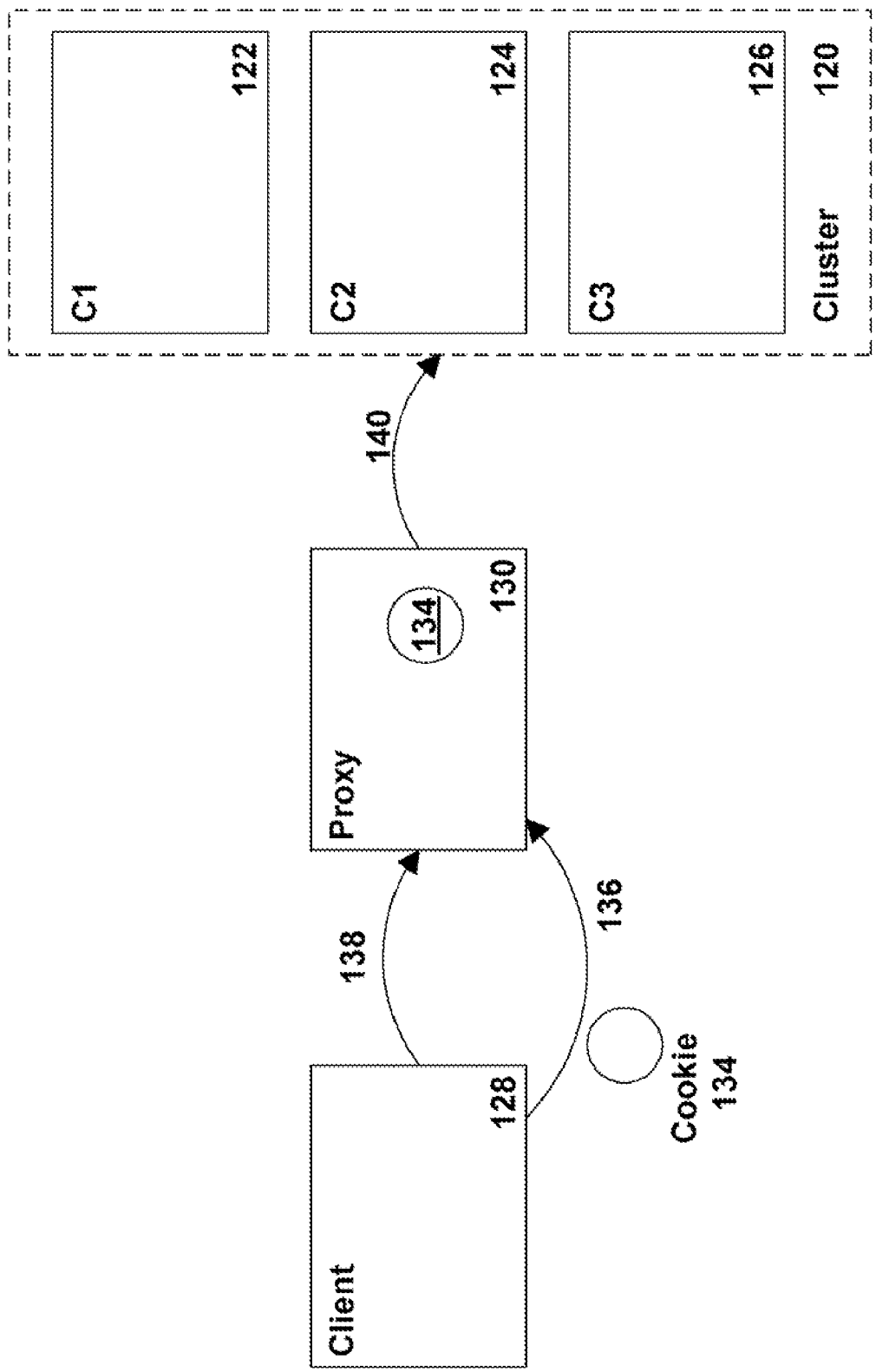
FIG. 2 shows an example of a clustered system that provides clustered tunneling of requests in accordance with an embodiment of the invention.

FIG. 2 shows an example of a clustered system that provides clustered tunneling of requests in accordance with an embodiment of the invention. As shown in FIG. 2, the cluster 120 includes a number of cluster members or servers 122, 124, 126 as before. A client 128 communicates with the cluster via a proxy 130. Each of the cluster members publishes an IOR including the specific addressing information for that member such as the name and port. However, the proxy cannot advertise the internal addresses of the server because the client would then attempt to connect to that server. Instead, in a tunneling layer of the client, only the address of the proxy is set so that all requests then go to that proxy. The advertised address and port of the cluster member is set in a special header. The client sends 136 a cookie 134 to the proxy, wherein the cookie specifies the target IOR. When the client then connects 138 to the proxy using the proxy address, the proxy uses the information in the cookie to locate the correct server. In one embodiment the proxy rewrites 140 the address based on the IOR of the designated cluster member, as specified in the cookie.

During a failover situation the client gets the response that the destination server has failed. The proxy may attempt to forward the request to another server. The tunneling layer at the client will detect that the server has changed, and a failover code will then connect the client to another server, again via the proxy.

Figure 3:
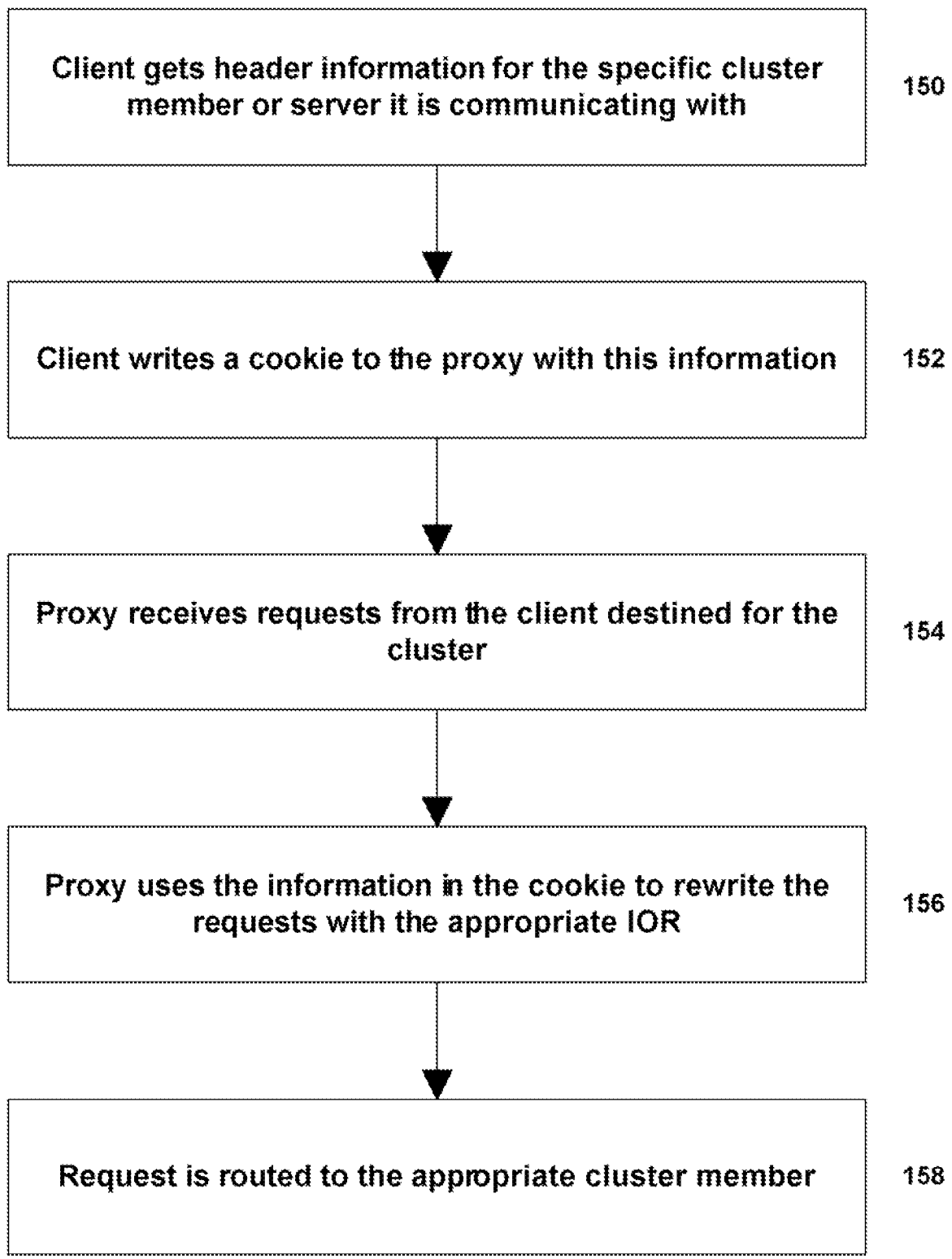
FIG. 3 shows a flowchart of a process for handling clustered tunneling of requests in accordance with an embodiment of the invention.

FIG. 3 shows a flowchart of a process for handling clustered tunneling of requests in accordance with an embodiment of the invention. As shown in FIG. 3, in step 150, the client gets header information for the specific cluster member or server it is communicating with. In step 152, the client writes a cookie to the proxy with this information. In step 154, the proxy receives requests from the client destined for the cluster. In step 156 the proxy uses the information in the cookie to rewrite the requests with the appropriate IOR. In step 158, the request is routed to the appropriate cluster member.

The present invention may be conveniently implemented using a conventional general purpose or a specialized digital computer or microprocessor programmed according to the teachings of the present disclosure. Appropriate software coding can readily be prepared by skilled programmers based on the teachings of the present disclosure, as will be apparent to those skilled in the software art.

In some embodiments, the present invention includes a computer program product which is a storage medium (media) having instructions stored thereon/in which can be used to program a computer to perform any of the processes of the present invention. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

The foregoing description of the present invention has been provided for the purposes of illustration and description. It is not intended to be exhaustive or to limit the invention to the precise forms disclosed. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

What is claimed is:

1. A system for clustered tunneling of requests with a proxy, comprising:
    a cluster, including a plurality of cluster members;
    a proxy for receiving requests from clients and routing the requests to members in the cluster;
    a client which sends a request to the cluster via the proxy and receives an initial response from the cluster including address information about the cluster members, including a destination cluster member, and wherein the client
        uses the address information it initially receives to create a cookie that specifies information about the destination cluster member to be used with the client, stores the cookie, including the information about the destination cluster member, at the proxy through an out-of-band communication; and wherein the proxy then routes subsequent requests from the client according to the information in the cookie at the proxy.

2. The system of claim 1 wherein said cluster members advertise distinct IOR's identifying each cluster member.

3. The system of claim 2 wherein the address information about the cluster members includes said IOR information about the cluster members.

4. A method for clustered tunneling of requests with a proxy, comprising the steps of:

sending a request from a client through a proxy to a cluster including a plurality of cluster members;

receiving at the client an initial response from the cluster including address information about the cluster members, including a destination cluster member;

creating a cookie by the client based on the address information it initially receives wherein the cookie specifies information about the destination cluster member to be used with the client;

storing the cookie, including the information about the destination cluster member, by the client at the proxy, through an out-of-band communication; and receiving subsequent requests at the proxy from the client and routing those requests to the member in said cluster specified by said information in the cookie at the proxy.

5. The method of claim 4 wherein said cluster members advertise distinct IOR's identifying each cluster member.

6. The method of claim 5 wherein the information about the cluster includes said IOR information about the cluster member.

7. A system for clustered tunneling of requests between a client and a cluster, comprising:

a proxy for receiving requests from a client and routing requests to members in a cluster;

wherein said client stores a cookie at the proxy through an out-of-band communication, said cookie is created by the client and specifies information about the destination cluster member to be used with said client, and wherein the proxy then routes subsequent requests from said client according to said information.

8. The proxy of claim 7 wherein said cluster members advertise distinct IOR's identifying each cluster member.

9. The proxy of claim 8 wherein the proxy uses the cookie to map client requests to said IOR information.

10. A client for use in clustered tunneling of requests between the client and a cluster, comprising:

a tunneling layer which receives IOR information about a cluster member, in an initial response from a cluster, and uses this information to create a cookie, wherein the client stores the cookie to a proxy through an out-of-band communication; and wherein the tunneling layer communicates requests to the proxy which routes the requests to the cluster member using the information in the cookie at the proxy.

11. The system of claim 1 wherein the client comprises:

a tunneling layer which receives IOR information about a cluster member and uses the IOR information to create the cookie; and wherein the tunneling layer communicates requests to the cluster member via the proxy.

12. The system of claim 1 wherein if the destination cluster members fails then the proxy forwards the request to another cluster member, the client detects the changed cluster member, and a failover code connects the client to a new cluster member.

13. The system of claim 1 wherein the proxy uses the information in the cookie to rewrite the requests and route the requests to the destination cluster member.

14. The system of claim 1 wherein the cluster does not advertise the internal addresses of the cluster members.

15. The method of claim 4 wherein the client comprises:

a tunneling layer which receives IOR information about a cluster member and uses the IOR information to create the cookie; and wherein the tunneling layer communicates requests to the cluster member via the proxy.

16. The method of claim 4 wherein the proxy uses the information in the cookie to rewrite the requests and route the requests to the destination cluster member.

17. The method of claim 4 wherein the cluster does not advertise the internal addresses of the cluster members.

18. The proxy of claim 7 wherein the client comprises:

a tunneling layer which receives IOR information about a cluster member and uses the IOR information to create the cookie; and wherein the tunneling layer communicates requests to the cluster member via the proxy.

19. The proxy of claim 7 wherein the cluster does not advertise the internal addresses of the cluster members.

20. The client of claim 10 wherein the cluster does not advertise the internal addresses of the cluster members.

* * * * *

UNITED STATES PATENT AND TRADEMARK OFFICE
CERTIFICATE OF CORRECTION

PATENT NO.        : 7,603,454 B2                                                                Page 1 of 1
APPLICATION NO. : 11/129900
DATED             : October 13, 2009
INVENTOR(S)       : Andrew Piper It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1146 days.

Signed and Sealed this

Fifth Day of October, 2010

David J. Kappos
*Director of the United States Patent and Trademark Office*